(12) United States Patent
Carpenter et al.

(10) Patent No.: US 9,664,536 B2
(45) Date of Patent: May 30, 2017

(54) CALIBRATION MECHANISM FOR PROXIMITY SWITCH

(71) Applicant: General Equipment and Manufacturing Company, Inc., Louisville, KY (US)

(72) Inventors: Scott Carpenter, Sellersburg, IN (US); Charles C. Bilberry, Louisville, KY (US)

(73) Assignee: General Equipment and Manufacturing Company, Louisville, KY (US)

( * ) Notice: Subject to any disclaimer, the term of this patent is extended or adjusted under 35 U.S.C. 154(b) by 304 days.

(21) Appl. No.: 14/612,610

(22) Filed: Feb. 3, 2015

(65) Prior Publication Data

US 2015/0233741 A1 Aug. 20, 2015

Related U.S. Application Data

(60) Provisional application No. 61/940,027, filed on Feb. 14, 2014.

(51) Int. Cl.
*G01D 5/244* (2006.01)
*H01H 36/00* (2006.01)

(52) U.S. Cl.
CPC ..... *G01D 5/24452* (2013.01); *H01H 36/0006* (2013.01); *H01H 36/0033* (2013.01)

(58) Field of Classification Search
CPC .......... G01D 5/24452; H01H 36/0006; H01H 36/0033; F16C 3/03
USPC ................... 324/601, 202, 207.26
See application file for complete search history.

(56) References Cited

U.S. PATENT DOCUMENTS

| | | | | |
|---|---|---|---|---|
| 9,341,283 B2* | 5/2016 | Daniels | ............ | B23Q 5/326 |
| 2013/0021123 A1* | 1/2013 | Merrifield | ............ | H01H 19/06 |
| | | | | 335/205 |
| 2013/0169391 A1* | 7/2013 | LaFountain | ............ | H01H 19/06 |
| | | | | 335/219 |
| 2014/0062579 A1* | 3/2014 | Rigsby | ............ | H01H 36/00 |
| | | | | 327/517 |
| 2015/0034183 A1* | 2/2015 | Jennings | ............ | F16K 1/221 |
| | | | | 137/524 |
| 2015/0034848 A1* | 2/2015 | Penning | ............ | F16K 37/0033 |
| | | | | 251/65 |

(Continued)

*Primary Examiner* — Patrick Assouad
*Assistant Examiner* — Khristopher Yodichkas
(74) *Attorney, Agent, or Firm* — Marshall, Gerstein & Borun LLP

(57) ABSTRACT

A calibration system having an actuator with a rotatable shaft and a switch box housing a proximity switch and a calibration mechanism. The calibration mechanism is coupled to the shaft and includes a base, a target carrier, a driver, and an actuating button having a cam. The base includes a locating magnet, and the target carrier includes a primary magnet and a bias magnet polarized in the same direction as the locating magnet. The driver is shiftable between a first position in which the driver engages the target carrier and a second position disengaged from the target carrier. The cam engages the driver and shifts the driver between the first and second positions. Upon rotation of the shaft, the bias magnet automatically moves to a position aligned with the locating magnet when the driver is in the second position.

21 Claims, 9 Drawing Sheets

(56) References Cited

U.S. PATENT DOCUMENTS

2015/0039142 A1* 2/2015 LaFountain .......... G01D 5/2525
700/282

* cited by examiner

CALIBRATION MECHANISM FOR PROXIMITY SWITCH

FIELD OF THE DISCLOSURE

This disclosure relates generally to magnetic proximity switches, and, more particularly, to a calibration mechanism for proximity switch.

BACKGROUND

Magnetic proximity switches, also known as limit switches, are commonly used for linear position sensing. Generally, magnetic proximity switches typically include a target and a sensor. The sensor is coupled to a switching circuit having two leaf portions, a stationary portion and a movable portion hermetically sealed within a glass enclosure contained within a switch body. When the target passes within a predetermined range of the sensor, the magnetic flux generated by the target magnet causes the movable leaf to contact the stationary leaf, thereby closing the switch.

FIG. 1 depicts a conventional proximity switch 10 disposed within a switch box 12 operatively coupled to a rotary actuator 14 having a shaft 16. The switch box 12 includes an opening through which the shaft 16 passes. The switch box 12 houses both the conventional proximity switch 10 and a target carrier 18 having two target magnets 20 disposed thereon. The target carrier 18 also includes an opening for receiving the shaft 16, such that when the shaft 16 is rotated the target carrier 18 is rotated. To set the proximity switch 10 to trigger at a certain point of rotation of the actuator 14, the actuator 14, and, thus, the shaft 16, is rotated to that desired point. The proximity switch 10 is stationary; it never moves even when the shaft 16 moves.

However, as the actuator 14 is moved to set the angle of rotation at which the proximity switch 10 will be triggered, the shaft 16 moves and the target carrier 18 rotates. The target magnets 20 disposed thereon move to a non-calibrated position or a position that is not aligned with the proximity switch 10. As a result, a user must manually open the lid (not shown) of the switch box 12 to manually move the target magnets 20 back into alignment with the proximity switch 10. In other words, after the actuator 14 is rotated to a desired point at which the proximity switch 10 is to be triggered, one must physically set the proximity switch 10 to that point by moving the target magnets 20 back into alignment with the proximity switch 10, e.g., "zeroing" the proximity switch 10.

Thus, each time it is desired to change the angle at which the conventional proximity switch 10, such as a GoS-witch™, will be triggered, e.g., from 45° to 90° to 180° from the longitudinal axis of the shaft 16, a user must open a lid (not shown) of the switch box 12 to physically manipulate the system. This can cause valuable time loss to users, as certain operations may have to be halted while the switch box 12 is being worked on due to the switch box 12 being open, for example.

BRIEF SUMMARY OF THE DISCLOSURE

In accordance with one exemplary aspect of the present invention, a calibration system for calibrating a proximity switch comprises an actuator operatively coupled to a process control device and having a rotatable shaft, and a switch box housing the proximity switch and coupled to the actuator. The calibration system further includes a calibration mechanism coupled to the shaft and having a base, a target carrier, a driver, and an actuating button having a cam. The base is rotationally fixed to the shaft and includes a locating magnet and a ring magnet. The target carrier is coupled to the shaft and disposed adjacent the base, and has a primary magnet and a bias magnet. The primary magnet and the bias magnet are polarized in the same direction as the locating magnet and the ring magnet of the base. The driver is slidably coupled to the shaft and rotationally fixed to the shaft. The driver is also shiftable between a first position in which the driver engages the target carrier to rotationally fix the target carrier to the shaft, and a second position disengaged from the target carrier to permit the target carrier to rotate relative to the shaft. The cam operatively couples the actuating button to the driver and is arranged to shift the driver between the first position and the second position.

Upon rotation of the shaft, the bias magnet is movable about an axis of the shaft relative to the locating magnet when the driver is in the first position. The bias magnet automatically moves to a position aligned with the locating magnet when the driver is in the second position.

According to another aspect of the present disclosure, a calibration mechanism comprises a base adapted to be rotationally fixed to a shaft of an actuator and including a locating magnet. A target carrier is adapted to be coupled to the shaft and disposed adjacent the base, and has a primary magnet and a bias magnet. The primary magnet and the bias magnet are polarized in the same direction as the locating magnet. A driver is adapted to be slidably coupled to the shaft and rotationally fixed to the shaft. The driver is shiftable between a first position in which the driver engages the target carrier, and a second position disengaged from the target carrier to permit the target carrier to rotate relative to the shaft. An actuating button includes a cam that operatively couples the actuating button to the driver and is arranged to shift the driver between the first position and the second position.

Upon rotation of the shaft, the bias magnet is movable about an axis of the shaft relative to the locating magnet when the driver is in the first position. The bias magnet automatically moves to a position aligned with the locating magnet when the driver is in the second position.

According to yet another aspect of the present disclosure, a method of calibrating a proximity switch comprises attaching a base of a calibration mechanism to a target carrier of the calibration mechanism. The base includes a ring magnet and a locating magnet polarized in the same direction. The target carrier includes a primary magnet and a bias magnet polarized in the same direction as the ring and locating magnets and rotatable about the shaft. The method further comprises engaging a driver of the calibration mechanism with the target carrier, the driver rotatable about the shaft when engaged with the target carrier; actuating a actuating button of a calibration mechanism to a depressed position; and disengaging a driver of the calibration mechanism from a target carrier of the calibration mechanism. The method still further comprises allowing the primary magnet of the target carrier to move back to a position in which the primary magnet is aligned with the proximity switch via the magnets; returning the actuating button to an undepressed position; and reengaging the driver with the target carrier.

DETAILED DESCRIPTION

Figure 1A:
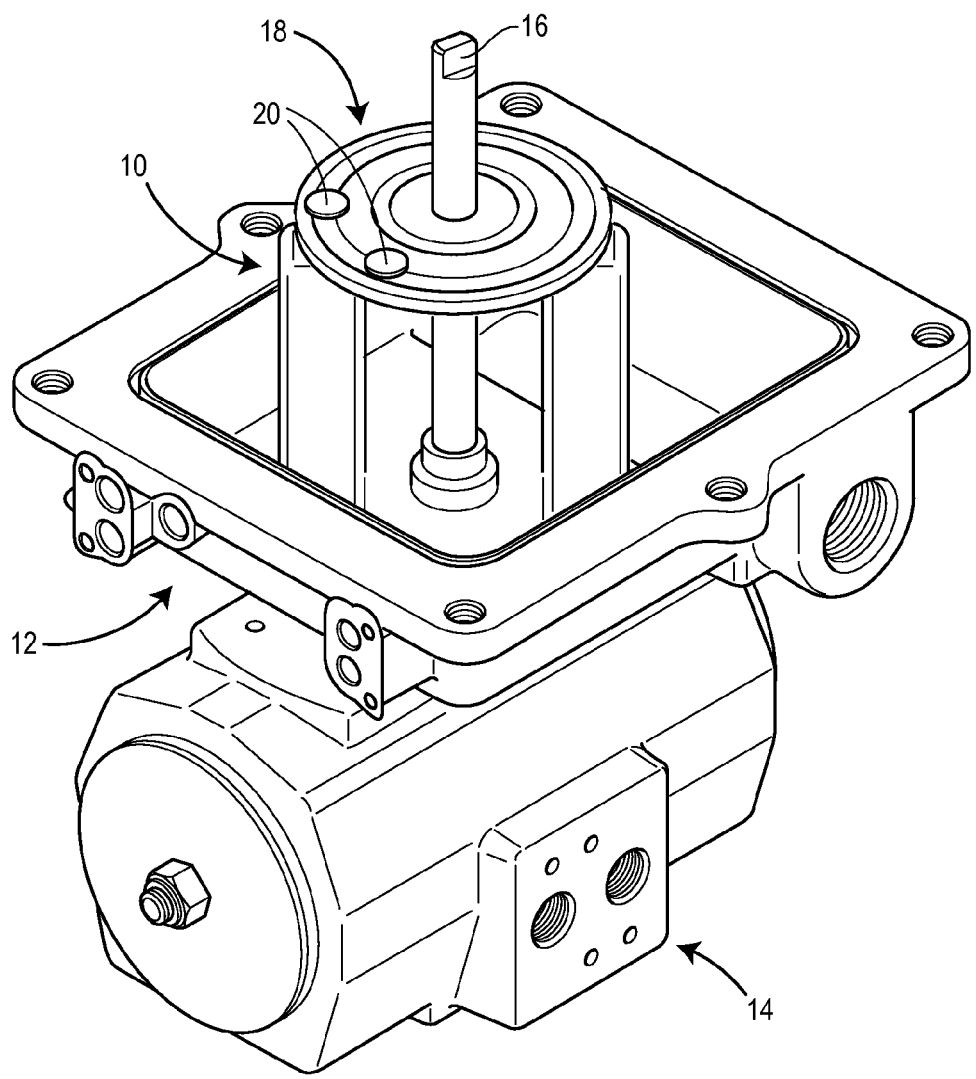
FIG. 1A is a perspective view of a conventional target carrier and proximity switch disposed within a switch box having a lid removed.
Figure 1B:
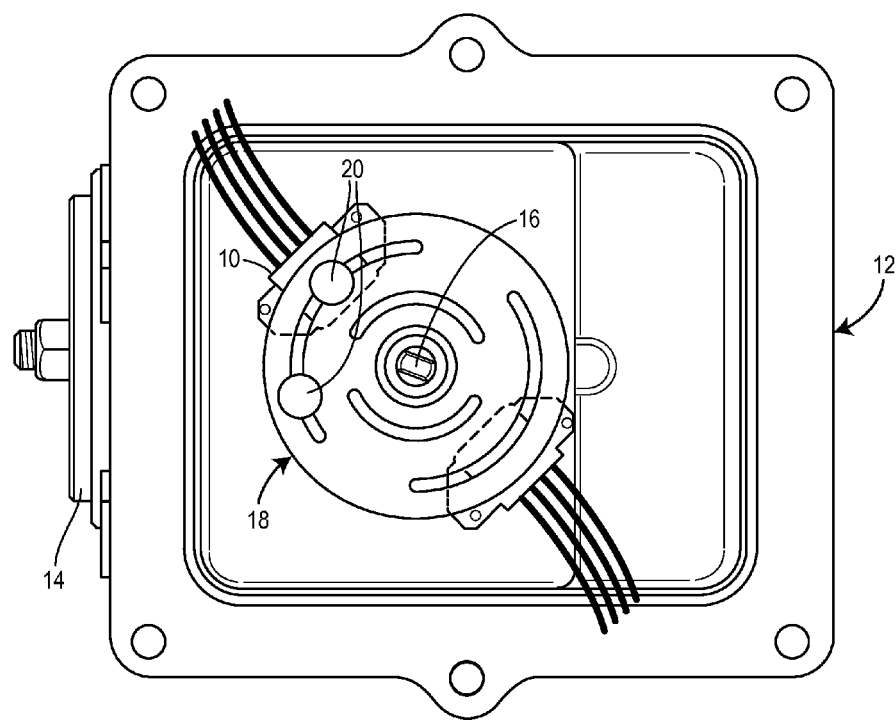
FIG. 1B is a top view of the conventional target carrier and proximity switch of FIG. 1.
Figure 2:
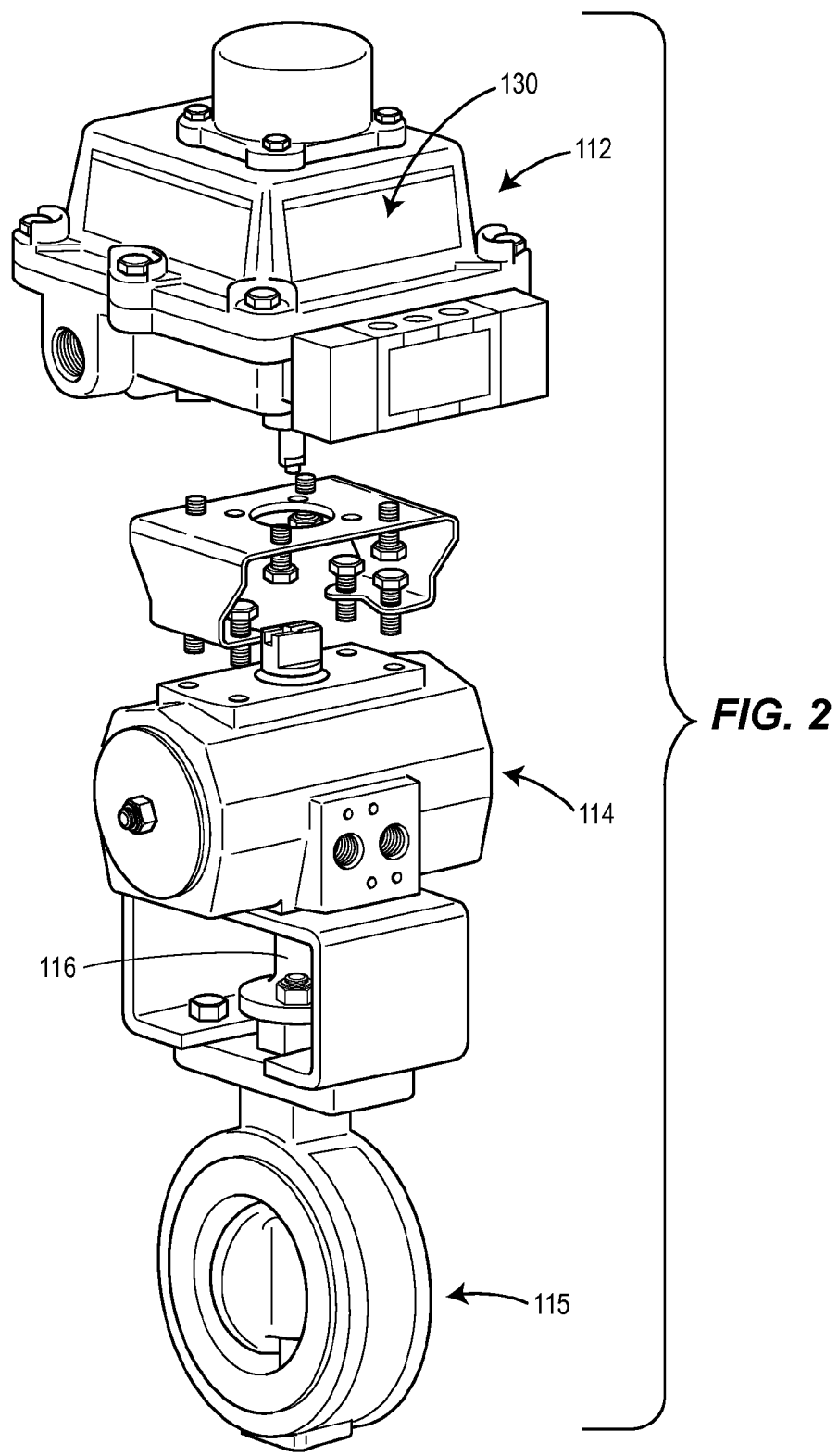
FIG. 2 is an exploded, perspective view of an actuator operatively coupled to a process control device and a switch box coupled to the actuator, the switch box having a calibration mechanism according to one aspect of the present disclosure.

Referring now to FIG. 2, an actuator 114 operatively coupled to a process control device 115 is depicted. The process control device 115 may be a valve controller, such as a Topwork™ Valvetop Discrete Valve Controller, and is operatively coupled to an output shaft 116 of the actuator 114. The output shaft 116 includes a longitudinal axis, and the actuator 114 rotates the shaft 116 relative to the longitudinal axis. A switch box 112 is coupled to the actuator 114 and includes a proximity switch (not shown) and a calibration mechanism 130 of the present disclosure.

Figure 3:
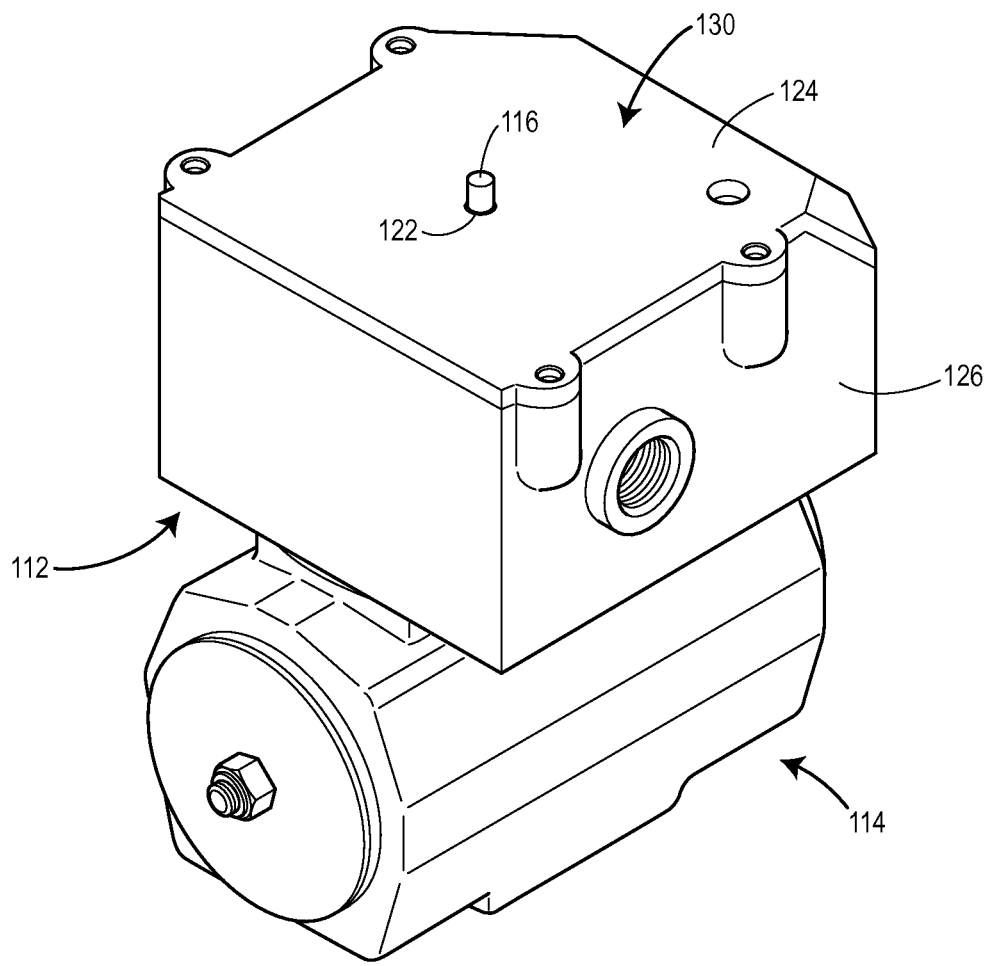
FIG. 3 is a perspective view of a switch box coupled to an actuator, the switch box having the calibration mechanism according to one aspect of the present disclosure.

As depicted in FIG. 3, the output shaft 116 of the actuator extends through an opening 122 of a lid 124 of the switch box 112. The lid 124 is connected to a housing 126 of the switch box 112 to enclose the housing 126 and the components disposed therein.

Figure 4:
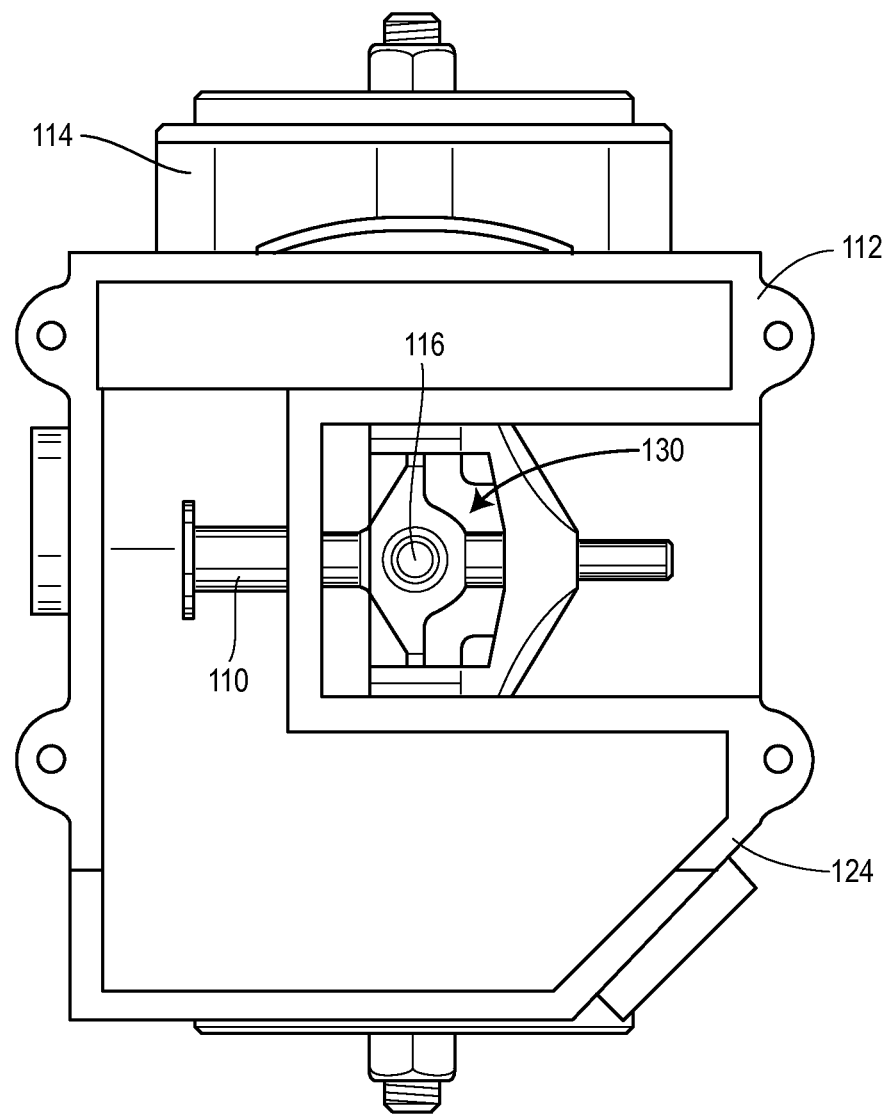
FIG. 4 is a top view of the switch box of FIG. 3 with a lid of the switch box removed, such that the calibration mechanism of the present disclosure is visible within the switch box.

Referring now to FIG. 4, the calibration mechanism 130 according to one aspect of the present disclosure is depicted within the housing 124 of the switch box 112 and is coupled to the shaft 116. As illustrated therein, the calibration mechanism 130 is disposed within a central area of the housing 124 adjacent to the proximity switch 110, such as a Topworx™ GoSwitch™. Of course, as one of skill in the art will appreciate, various other types of proximity switches may be disposed within the housing of 124 of the switch box 112 and still fall within the scope of the present disclosure.

Figure 5:
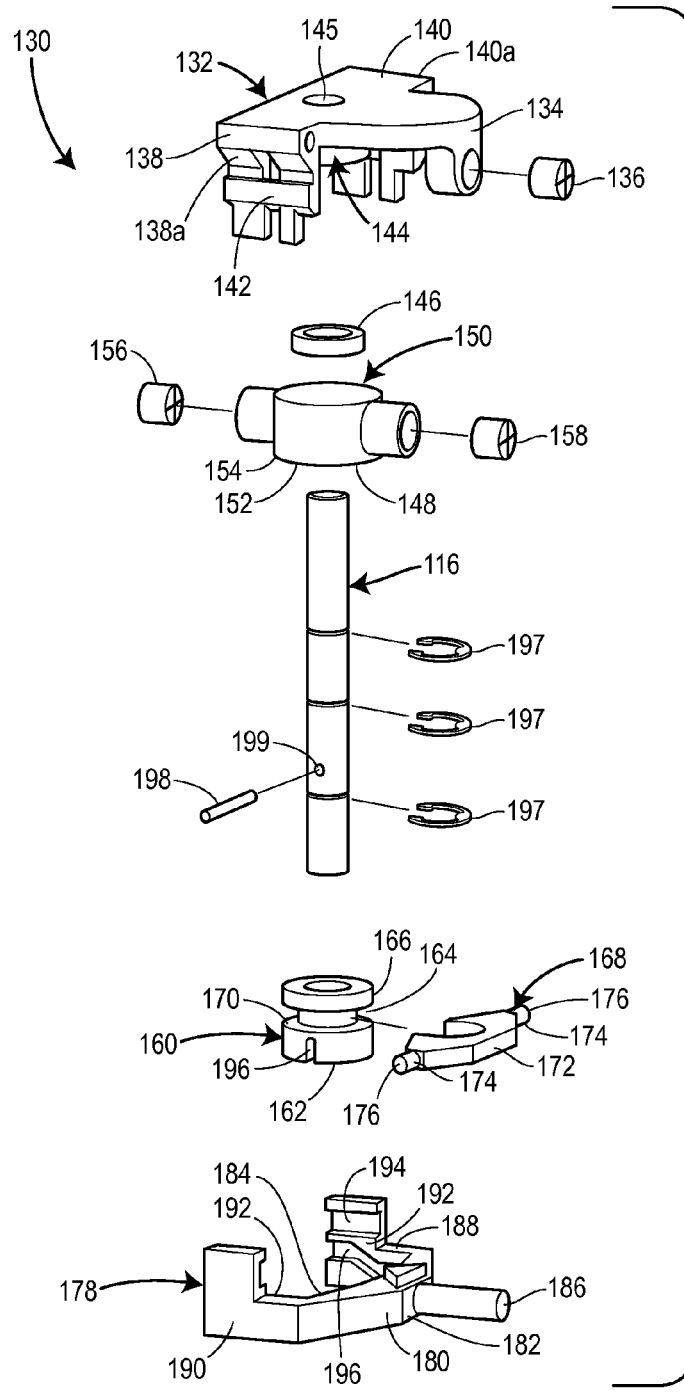
FIG. 5 is an exploded view of the calibration mechanism of one aspect of the present disclosure.

As depicted in FIG. 5, the calibration mechanism 130 includes a base 132 having an end 134 with a locating magnet 136 and is rotationally fixed to the shaft 116. The locating magnet 136 may be a Bilberry expansion magnet, or any other magnet that achieves the same function as the locating magnet 136, and still fall within the scope of the present disclosure. The base 132 further includes a first side wall 138 and a second side wall 140 disposed opposite the first side wall 138. Each of the first and second side walls 138, 140 includes an outer surface 138a and 140a, respectively. A projection 142 extends from each outer surface 138a, 140a and may include a rail, a cam, a semi-circular portion, a circular portion, a rounded portion, a tab, a peg, an arm or any other structure that achieves the same function of the projection 142. A central portion 144 is disposed between the side walls 138, 140 and includes a ring magnet 146 affixed thereto. The central portion 144 further includes an opening 145 for receiving the output shaft 116 of the actuator 114, and the ring magnet 146 surrounds the opening 145.

The locating magnet 136 and the ring magnet 146 of the base 132 are polarized in the same direction. For example, the north pole of the locating magnet 136 may face the same direction as the north pole of the ring magnet 146. More specifically, in one example, the north pole of the locating magnet 136 faces the proximity switch 110, and the north pole of the ring magnet 146 also faces the proximity switch 110.

The calibration mechanism 130 further includes a target carrier 148 that is coupled to the shaft 116 and disposed adjacent to the base 132. The target carrier 148 includes a central opening 150 that defines an inside cylindrical surface 152 with a spline path 154. Upon assembly, the target carrier 148 is disposed within the central portion 144 of the base 132. The ring magnet 146 of the base 132 fits within the central opening of the target carrier 148. The target carrier 148 further includes a primary magnet 156 and a bias magnet 158 disposed opposite the primary magnet 156. The primary magnet 156 and the bias magnet 158 are polarized in the same direction, and are also polarized in the same direction as the locating and ring magnets 136, 146 of the base 132. In one example, the north pole of the primary magnet 156 and the north pole of the bias magnet 158 both face the proximity switch 110.

A driver 160 is disposed within the cylindrical opening 152 of the target carrier 148 and drives the target carrier 148, as explained more below. The driver 160 includes a cylindrical body 162 with an outer portion 164 having a spline path 166. In one example, the spline path 166 is disposed along a circumference of the cylindrical body 162. The spline path 166 of the driver 160 engages the spline path 154 of the target carrier 148, which helps the driver 160 drive the target carrier 148.

The driver 160 is slidably coupled to the shaft 116 and rotationally fixed to the shaft 116. The driver 160 is shiftable between a first position and a second position. In the first position, the driver 160 engages the target carrier 148 to rotationally fix the target carrier 148 to the shaft 116. In the second position, the driver 160 is disengaged from the target carrier 148 to permit the target carrier 148 to rotate relative to the shaft 116, as also explained more below.

A collar 168 is disposed around a neck portion 170 of the driver 160. The collar 168 has a body 172 and a pair of arms 174 extending from the body 172. Each arm 174 of the pair of arms 174 may include a peg 176.

The calibration mechanism 130 further includes an actuating button 186 having a cam 178. The cam 178 operatively couples the actuating button 186 to the driver 160 and is arranged to shift the driver 160 between the first and second positions. The cam 178 may also interface with the base 132 to form a housing of the calibration mechanism 130.

In one example, the cam 178 includes an end 180 with an outer surface 182 and an inner surface 184, and the actuating button 186 is disposed on the outer surface 182. The actuating button 186 is accessible through an opening in the switch box 112 and does not require the lid 124 to be removed from the housing 126 (FIG. 3) to actuate. The cam 178 further includes a first side 188 and a second side 190 disposed opposite the first side 188. Each of the first and second sides 188, 190 includes an inner surface 192 having a slot 194. Upon assembly of the calibration mechanism 130, the projections 142 fit within the slots 194 of each side 188, 190 of the cam 178, slidably mounting the actuating button 186 to the base 132. A pathway 196 for receiving the pegs 176 of the arms 174 of the collar 168 when the actuating button 186 is actuated, as explained more below, is disposed adjacent to the slot 194.

Upon rotation of the actuator 114, the shaft 116 rotates and the driver 160 and the target carrier 148 rotate around the shaft 116. This moves the primary magnet 156 of the target carrier 148 from an aligned position to an unaligned position. The aligned position is a position that is aligned with the proximity switch 110, for example. The unaligned position is any position in which the primary magnet 156 at is not aligned with the proximity switch.

Also upon rotation of the shaft 116, the bias magnet 158 is moveable about an axis of the shaft 116 relative to the locating magnet 136 when the driver 160 is in a first position, or a position in which the driver 160 is engaged with the target carrier 168. When the driver 160 is in a second position, or a position that is not engaged with target carrier 168, the bias magnet 158 is allowed to automatically move to a position that is aligned with the locating magnet 136 via all the magnets being polarized in the same direction.

Upon actuation of the actuating button 186, the pegs 176 of the arms 174 of the collar 168 move into the pathway 196 of the cam 178. As depicted in FIG. 5, each pathway 196 may include a downwardly sloping portion, such that upon entry into the pathway 196, each peg 176 of each arm 174 moves downward. This in turn moves the driver 160 in a downward direction and disengages the driver 160 from the target carrier 148. The disengagement between the driver 160 and the target carrier 148 allows the primary magnet 156 to automatically return to the aligned position via the locating and ring magnets 136, 146, for example, independent of the driver 160. This disengagement between the driver 160 and the target carrier 148 also allows the bias magnet 158 to move from an unaligned position, in which the bias magnet 158 is not aligned with the locating magnet 136, to an aligned position. For example, the aligned position is the position in which the bias magnet 158 is aligned with the locating magnet 136. The polarity of all the magnets cause the primary magnet 156 and the bias magnet 158 to realign with the proximity switch 110 and the locating magnet 136, respectively. All of the magnets, the primary magnet 156, the bias magnet 158, the locating magnet 136, and the ring magnet 146, rest along a single axis with alternating poles in the aligned position.

Figure 6:
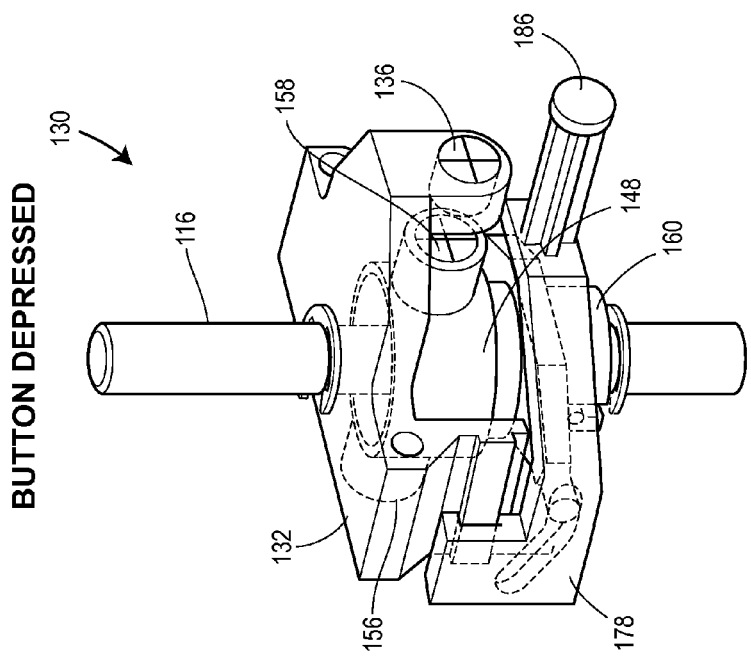
FIG. 6 is an assembled, perspective view of the calibration mechanism of FIG. 5, with an actuating button of the calibration mechanism in an extended or undepressed position.
Figure 7:
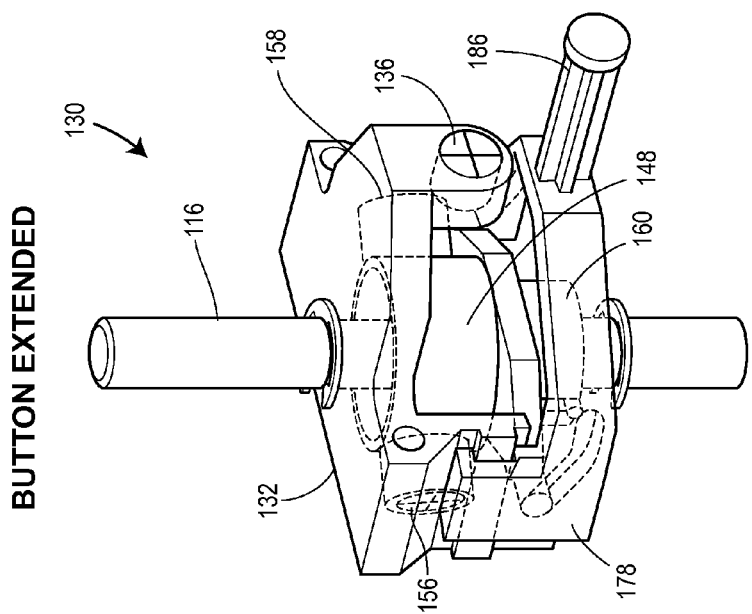
FIG. 7 is another assembled, perspective view of the calibration mechanism of FIG. 5, with the actuating button of the calibration mechanism in an actuated or depressed position.

In other words, and referring now to FIGS. 6 and 7, when the actuating button 186 is depressed or actuated, one or more of the primary magnet 156 and the bias magnet 158 moves from an unaligned position (FIG. 6) back to an aligned position (FIG. 7). More specifically, the primary magnet 156 moves from a position in which it is not aligned with the proximity switch 110 to a position in which it is aligned with the proximity switch 110, and the proximity switch 110 is calibrated. The bias magnet 158 moves from a position in which it is not aligned with the locating magnet 136 to a position in which it is aligned with the locating magnet 136. Thus, actuation of the actuating button 186 automatically calibrates the proximity switch 110. While FIG. 6 depicts one of many possible unaligned positions of the primary magnet 156 and the bias magnet 158, the primary magnet 156 may be in any position along the longitudinal axis of the shaft 116 that is not aligned with the proximity switch 110. The bias magnet 158 may be in any position not aligned with the locating magnet 136.

In addition, and as depicted in FIG. 6, when the actuating button 186 is in an extended or undepressed position, the driver 160 is disposed within and engaging the target carrier 148. More specifically, the driver 160 is constrained to the target carrier 148 by the spline path 166 of the driver 160 that engages the spline path 154 of the target carrier 148. In other words, the target carrier 148 and the driver 160 are rotationally fixed to one another by a splined connection when the driver 160 is in the first position, the position in which the driver 160 engages the target carrier 148.

When the actuating button 186, however, is depressed or actuated, as depicted in FIG. 7, the driver 160 is moved out of the target carrier 148 because the arms 174 of the collar 168 move into the pathway 196 of the cam 178. This allows the driver 160 to move downward and disengage from the target carrier 148, as explained above.

The actuating button 186 is biased in an extended or undepressed position (FIG. 6) by the force of a spring (not shown). As such, after actuation of the actuating button 186 (FIG. 7) and movement of the primary magnet 156 back to the aligned position from the unaligned position, the actuating button 186 automatically returns to the undepressed position by the spring force. This moves the arms 174 of the collar 168 out of the pathway 196 of the cam 178, and the driver 160 back into the target carrier 148, reengaging the driver 160 with the target carrier 148. More specifically, the spline paths 166, 154 of the driver 160 and the target carrier 148 reengage and the target carrier 148 is constrained to the driver 160. In one example, the cam 178 includes a cylindrical portion (not shown) extending from the inside surface 184 of the end 182 of the cam 178. A spring for biasing the actuating button 186 may be disposed on the cylindrical portion.

Said another way, FIG. 6 depicts a first state of the calibration mechanism 130 in which the actuating button 168 is in an undepressed position and the target carrier 148 is constrained to the driver 160 or in the first position. In one example, the target carrier 148 is constrained to the driver 160 via splines of the driver 160 and the target carrier 148. This engagement prevents the primary magnet 156 from automatically moving back to the aligned position via the magnets after the shaft rotates the actuator 114 and target carrier 148. This engagement also prevents the bias magnet 158 from automatically moving back to a position aligned with the locating magnet 136.

FIG. 7, however, depicts a second state of the calibration mechanism 130 in which the actuating button is depressed or actuated and the driver 160 is disengaged from the target carrier 148 or in the second position. This disengagement allows the primary magnet 156 to automatically return to the aligned position via the primary and bias magnets 156, 158 that are polarized in the same direction as the ring and locating magnets 146, 136 of the base 132. This disengagement also allows the bias magnet 158 to automatically return to a position aligned with the locating magnet 136. Because the actuating button 186 is spring biased in the undepressed position, the actuating button 186 will automatically return to the undepressed position of FIG. 6 after actuation. This causes the driver 160 to move back into and engage the target carrier 148. In one example, the ring magnet 146 may also pull the driver 160 back into the target carrier 148 when the actuating button 186 moves back into the undepressed position. For example, the driver 160 may be biased by one or more of a spring, a magnet, or other suitable mechanism, such that the driver 160 moves back into the target carrier 148 via one or more of the spring, the magnet or other biasing mechanism.

In the example calibration mechanism 130 of FIGS. 5-7, the driver 160 is mechanically constrained to the shaft 116 via a roll pin 198. The roll pin 198 may be inserted into a slot 196 of the driver 160 and through another a bore 199 in the shaft 116, forming a pin-in-slot connection between the driver 160 and the shaft 116. In addition, a plurality of c-clips 197 limits sliding or axial movement of the base 132, the driver 160, and the cam 178, for example, along the shaft 116. While c-clips 197 are depicted in FIG. 5, for example, one of skill in the art will appreciate that couplings other than a c-clip may alternatively be used, such as any other structure or assembly that achieves the same function as the one or more c-clips 197 and still fall within the scope of the present disclosure. In a similar manner, one of skill in the art will also appreciate that a structure other than the roll pin 198 may alternatively be used to couple the driver 160 to the shaft 116 and still fall within the scope of the present disclosure.

Figure 8:
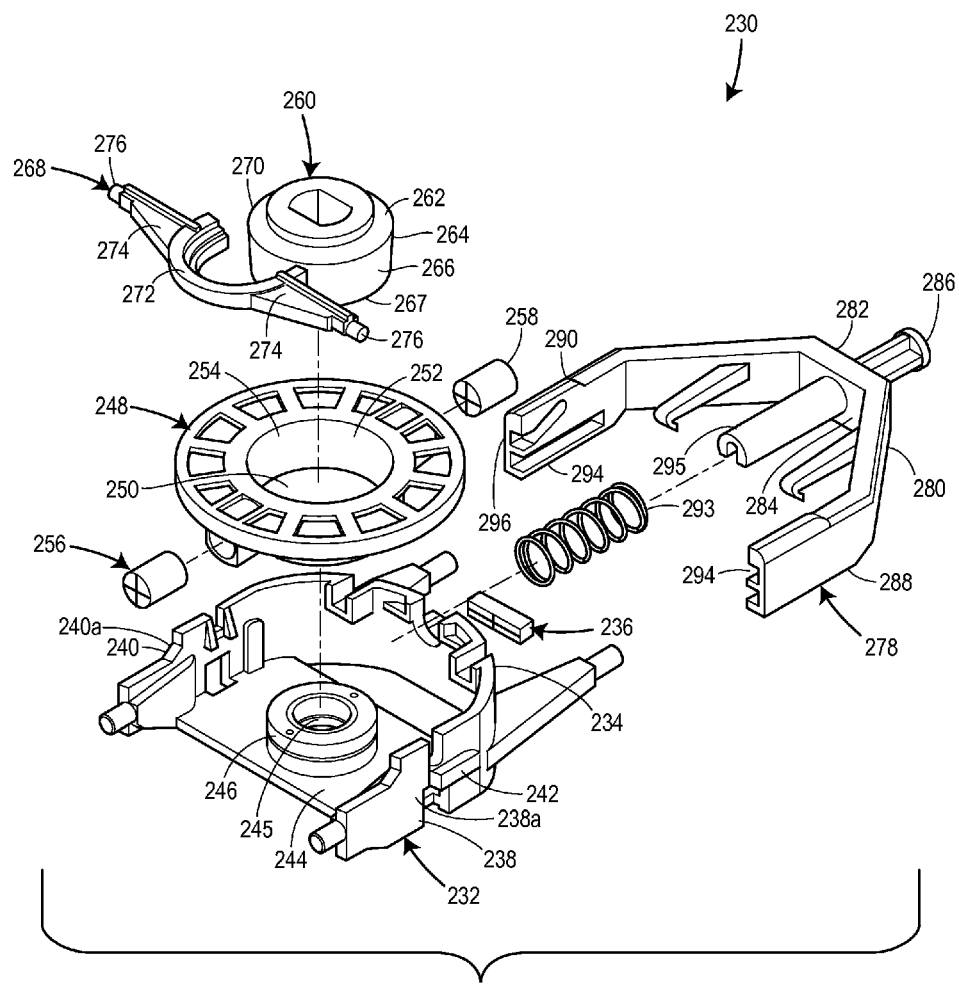
FIG. 8 is an exploded view of another example of a calibration mechanism according to another aspect of the present disclosure.
Figure 9:
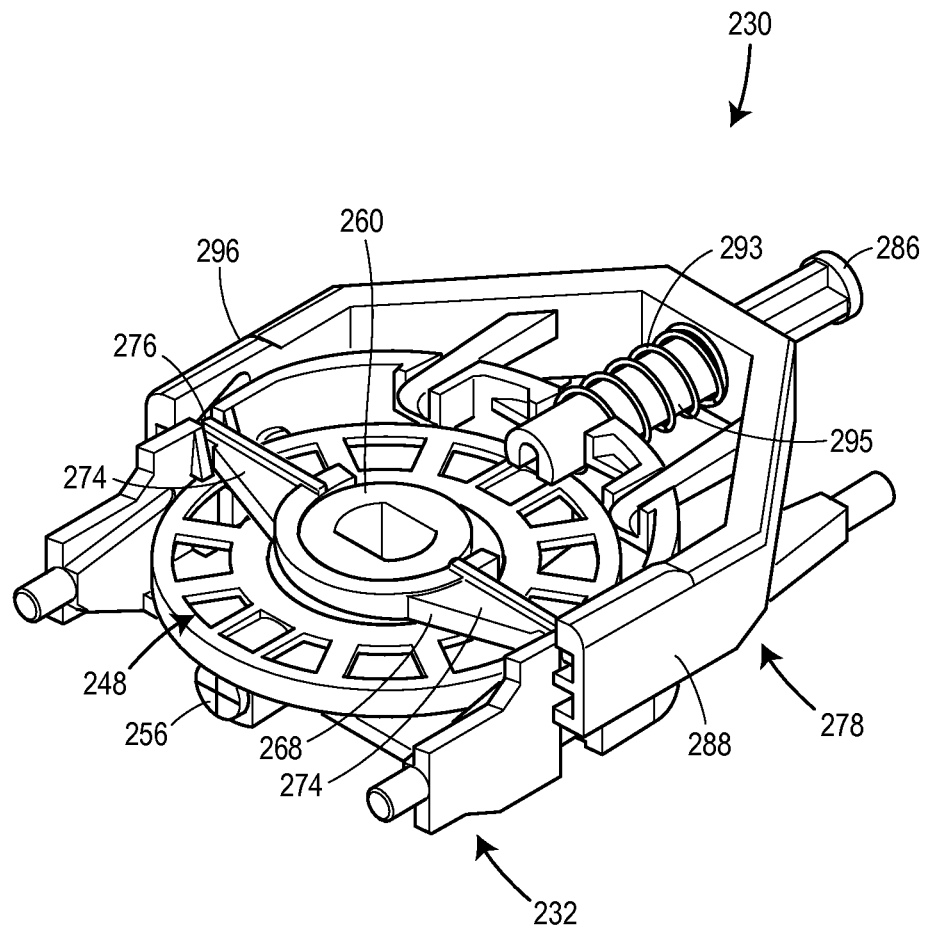
FIG. 9 is an assembled, bottom perspective view of the calibration mechanism of FIG. 8.

Referring now to FIGS. 8 and 9, a calibration mechanism 230 according to another aspect of the present disclosure is depicted. The calibration mechanism 230 includes essentially the same function and structure as the calibration mechanism 130 of FIGS. 3-7, with some minor modifications. For example, the calibration mechanism 230 does not require any hardware, such as a roll pin or C-clip, to locate pieces relative to the shaft 116 of the actuator 114 (FIGS. 3-4). Instead, a base of the calibration mechanism 230 handles locating pieces of the calibration mechanism 230 relative to the shaft 116, as explained more below. Aside from those differences, the calibration mechanism 230 functions in the same manner as the calibration mechanism 130, as also explained more below.

For consistency, please note that parts of the calibration mechanism 230 of FIGS. 8 and 9 that are the same as parts of the calibration mechanism 130 are similarly numbered. For example, the parts of the calibration mechanism 230 are numbered one hundred more, e.g., 230 instead of 130, than the same part of the calibration mechanism 130.

As depicted in FIG. 8, the calibration mechanism 230 includes a base 232 having an end 234 with a locating magnet 236 and is rotationally fixed to the shaft 116. Like the locating magnet 136, the locating magnet 236 may include a Bilberry expansion magnet or any other magnet having the same function as the locating magnet 236 and still fall within the scope of the present disclosure. The base 232 also includes a first side wall 238 and a second side wall 240 disposed opposite the first side wall 238. Each of the first and second side walls 238, 240 includes an outer surface 238*a* and 240*a*, respectively. A projection 242 extends from each outer surface 238*a*, 240*a* and may include a rail, a cam, a semi-circular portion, a circular portion, a rounded portion, a tab, a peg, an arm or any other structure that achieves the same function of the projection 242. A central portion 244 is disposed between the side walls 238, 240 and includes a ring magnet 246 affixed thereto. The central portion 244 further includes an opening 245 for receiving the output shaft 116 of the actuator 114, and the ring magnet 246 surrounds the opening 245.

The locating magnet 236 and the ring magnet 246 of the base 232 are polarized in the same direction. For example, the north pole of the locating magnet 236 may face the same direction as the north pole of the ring magnet 246. More specifically, in one example, the north pole of the locating magnet 236 faces the proximity switch 110, and the north pole of the ring magnet 246 also faces the proximity switch 110.

The calibration mechanism 230 further includes a target carrier 248 that is coupled to the shaft 116 and disposed adjacent to the base 232. The target carrier 248 includes a central opening 250 defining an inside cylindrical surface 252 with a spline path 254. Upon assembly, the target carrier 248 is disposed within the central portion 244 of the base 232. The ring magnet 246 of the base 232 fits within the central opening of the target carrier 248. The target carrier 248 further includes a primary magnet 256 and a bias magnet 258 that may be disposed opposite the primary magnet 256. The primary magnet 256 and the bias magnet 258 are polarized in the same direction, and are also polarized in the same direction as the locating and ring magnets 236, 246 of the base 232. In one example, the north pole of the primary magnet 256 and the north pole of the bias magnet 258 both face the proximity switch 110.

A driver 260 is disposed within the cylindrical opening 252 of the target carrier 248 and drives the target carrier 248. The driver 260 includes a cylindrical body 262 with an outer portion 264 having a spline path 266. In one example, the spline path 266 is disposed along a circumference of the cylindrical body 262. The spline path 266 of the driver 260 engages the spline path 254 of the target carrier 248, which helps the driver 260 drive the target carrier 248.

The driver 260 is slidably coupled to the shaft 116 and rotationally fixed to the shaft 116. The driver 260 is also shiftable between a first position and a second position. In the first position, the driver 260 engages the target carrier 248 to rotationally fix the target carrier 248 to the shaft 116. In the second position, the driver 260 is disengaged from the target carrier 248 to permit the target carrier 248 to rotate relative to the shaft 116, as also explained more below.

A collar 268 is disposed on the driver 260. In one example, the collar 268 is disposed around a neck portion 270 of the driver 260. The collar 268 has a body 272 and a pair of arms 274 extending from the body 272. Each arm 274 may include a peg 276.

A calibration mechanism 230 further includes an actuating button 286 having a cam 278. The cam 278 operatively couples the actuating button 286 to the driver 260 and is arranged to shift the driver 260 between the first and second positions. The cam 278 may also interface with the base 232 to form a housing of the calibration mechanism 230.

In one example, the cam 278 includes an end 280 with an outer surface 282 and an inner surface 284, and the actuating button 286 is disposed on the outer surface 282. Like the actuating button 186 of FIGS. 5-7, the actuating button 286 is also accessible through an opening in the switch box 112 and does not require the lid 124 to be removed from the housing 126 (FIG. 3) to actuate. The cam 278 further includes a first side 288 and a second side 290 disposed opposite the first side 288. Each of the first and second sides 288, 290 includes an inner surface 292 with a slot 294. The slots 294 may receive the projections 242 on the side walls 238, 240 of the base 232. Thus, upon assembly of the calibration mechanism 230, the projections 242 may fit within the slots 294, slidably mounting the actuating button 186 to the base 132. A pathway 296 is disposed adjacent to each slot 294. Each pathway 296 may receive the collar 268 and more specifically, the pegs 276 of the arms 274 of the collar 268 when the actuating button 286 is actuated, as explained more below.

The cam 278 further includes a cylindrical portion 295 extending from the inside surface 284 of the end 280. A spring 293 may be disposed around the cylindrical portion 295 to bias the actuating button 286 in an extended or undepressed position (FIG. 6).

Upon rotation of the shaft 116, the target carrier 248 and the driver 260 disposed therein rotate around the shaft 116. This moves both the primary magnet 256 and the bias magnet 258 of the target carrier 248 from an aligned position to an unaligned position. In other words, the primary magnet 256 moves from a position that is aligned with the proximity switch 110 to any position that is not aligned with the proximity switch. The bias magnet 258 moves to a position that is unaligned with the locating magnet 136.

Also upon rotation of the shaft 116, the bias magnet 258 is moveable about an axis of the shaft 116 relative to the locating magnet 236 when the driver 260 is in a first position, or a position in which the driver 160 is engaged with the target carrier 168. When the driver 260 is in a second position, or a position that is not engaged with target carrier 268, the bias magnet 258 is allowed to automatically move to a position that is aligned with the locating magnet 236.

The calibration mechanism 230 of FIGS. 8 and 9 operates in the same manner as the calibration mechanism 130 depicted in FIGS. 5-7. For example, upon actuation of the actuating button 286 of the cam 278, the collar 268, such as the pegs 276 of the arms 274 of the collar 268, engages the pathway 296 of the cam 278. This in turn moves the driver 260 in a downward direction and disengages the driver 260 from the target carrier 248. As a result, the target carrier 248 is no longer constrained by the driver 260, and the primary magnet 256 of the target carrier 248 is able to return to the aligned position, the position in which it is aligned with the proximity switch 110 (FIG. 4), via the magnets. In addition, the bias magnet 258 is allowed to move back to the position in which it is aligned with the locating magnet 236. Thus, actuation of the actuating button 286 automatically calibrates the proximity switch 110.

The polarity of all the magnets cause the primary magnet 256 and the bias magnet 258 to realign with the proximity switch 110 and the locating magnet 236, respectively. All of the magnets, the primary magnet 256, the bias magnet 258, the locating magnet 236, and the ring magnet 246, rest along a single axis with alternating poles in the aligned position.

When the actuating button 286 is in an undepressed position, the driver 260 is disposed within and constrained to the target carrier 248. In one example, splines of the spline paths 266, 254 of the respective driver 260 and target carrier 248 constrain the driver 260 to the target carrier 248.

The actuating button 286 is biased in the undepressed position by the force of the spring 293. As such, after actuation of the actuating button 286 and movement of the primary magnet 256 to the first position from the second position, the actuating button 286 returns to the undepressed position by the spring force. This in turn causes the collar 268 to move out of the pathway 296 of the cam 278, and the driver 260 to move back into the target carrier 248.

In view of the foregoing, one of skill in the art will understand that both the calibration mechanisms 130, 230 can effectively calibrate a proximity switch 110 without having to manually manipulate any part of the target carrier 148, 248. More specifically, there is no need to manually move the primary magnets 156, 256 back to an aligned position upon rotation of the actuator 114 and target carrier 148, 248, for example. As a result, operation of the system does not need to be halted or stopped to calibrate the proximity switch 110 and is, therefore, more efficient.

Both calibration mechanisms 130, 230 of the present disclosure may calibrate the proximity switch 110 by attaching the base 132, 232 of the calibration mechanism to the target carrier 148, 248, engaging the driver 160, 260 with the target carrier 148, 248, and actuating the actuating button 186, 286 to the depressed position. Upon actuation of the actuating button 186, 286, the driver 160, 260 disengages from the target carrier 148, 248, allowing the primary magnet 156, 256 to move back to the aligned position via the magnets. There is no need to manually manipulate any part of the target carrier 148, 248. After actuation, the actuating button 186, 286 returns to the undepressed position via the spring 293, for example, and the driver 160, 260 reengages the target carrier 148, 248.

In view of the foregoing, the calibration mechanism 130, 230 has the ability to "zero" or calibrate the proximity switch 110 without the need for removing the switch box 12 lid (not shown) and physically manipulating the primary magnets 156, 256. Thus, the calibration mechanism 130, 230 allows for calibration of the proximity switch 110 without disassembly of the switch box 12.

While various embodiments have been described above, this disclosure is not intended to be limited thereto. Variations can be made to the disclosed embodiments that are still within the scope of the appended claims.

What is claimed is:

1. A calibration system for calibrating a proximity switch coupled to a process control device, the calibration system comprising:
   an actuator operatively coupled to the process control device and having a rotatable shaft;
   a switch box housing the proximity switch and coupled to the actuator, the rotatable shaft extending into the switch box adjacent the proximity switch;
   a calibration mechanism coupled to the shaft, the calibration mechanism including a base, a target carrier, a driver, and an actuating button having a cam;
   the base rotationally fixed to the shaft and including a locating magnet and a ring magnet;
   the target carrier coupled to the shaft and disposed adjacent the base, the target carrier having a primary magnet and a bias magnet, the primary magnet and the bias magnet polarized in the same direction as the locating magnet and the ring magnet of the base;
   the driver slidably coupled to the shaft and rotationally fixed to the shaft, the driver shiftable between a first position in which the driver engages the target carrier to rotationally fix the target carrier to the shaft, and a second position disengaged from the target carrier to permit the target carrier to rotate relative to the shaft; and
   the cam operatively coupling the actuating button to the driver and arranged to shift the driver between the first position and the second position;
   wherein upon rotation of the shaft, the bias magnet is movable about an axis of the shaft relative to the locating magnet when the driver is in the first position, and wherein the bias magnet automatically moves to a position aligned with the locating magnet when the driver is in the second position.

2. The calibration system of claim 1, wherein the base includes at least one projection, and the actuating button includes at least one guide arranged to receive the at least one projection of the base, such that the actuating button is slidably mounted to the base, and wherein the cam includes at least one pathway for engaging a collar disposed on the driver.

3. The calibration system of claim 2, wherein actuation of the actuating button allows the bias magnet to move from an unaligned position, in which the bias magnet is not aligned with the locating magnet, to an aligned position, in which the bias magnet is aligned with the locating magnet and the proximity switch is calibrated.

4. The calibration system of claim 1, wherein the target carrier and the driver are rotationally fixed to one another by a splined connection when the driver is in the first position.

5. The calibration system of claim 2, wherein the actuating button is coupled to the driver by the collar, the collar having at least one arm that engages the pathway of the cam to disengage the driver from the target carrier, and the actuating button has a spring that biases the actuating button toward an undepressed position, such that after actuation, the actuating button automatically moves back to the undepressed position and the driver reengages the target carrier.

6. The calibration system of claim 5, the cam further comprising an end with an inner surface and an outer surface and a cylindrical portion extending from the inner surface, the cylindrical portion having the spring for biasing the actuating button toward the undepressed position.

7. A calibration mechanism for a proximity switch disposed within a switch box, the switch box operatively coupled to an actuator having a shaft, the calibration mechanism comprising:
a base adapted to be rotationally fixed to the shaft and including a locating magnet;
a target carrier adapted to be coupled to the shaft and disposed adjacent the base, the target carrier having a primary magnet and a bias magnet, the primary magnet and the bias magnet polarized in the same direction as the locating magnet;
a driver adapted to be slidably coupled to the shaft and rotationally fixed to the shaft, the driver shiftable between a first position in which the driver engages the target carrier, and a second position disengaged from the target carrier to permit the target carrier to rotate relative to the shaft; and
an actuating button having a cam operatively coupling the actuating button to the driver and arranged to shift the driver between the first position and the second position;
wherein upon rotation of the shaft, the bias magnet is movable about an axis of the shaft relative to the locating magnet when the driver is in the first position, and wherein the bias magnet automatically moves to a position aligned with the locating magnet when the driver is in the second position.

8. The mechanism of claim 7, wherein the driver is adapted to be coupled to the shaft by a pin-in-slot connection.

9. The mechanism of claim 8, wherein a plurality of c-clips limits sliding movement of the base, the driver, and the cam along the shaft.

10. The mechanism of claim 7, wherein base includes at least one projection, and the actuating button includes at least one guide, such that the actuating button is slidably mounted to the base, and wherein the cam includes at least one pathway for engaging a collar disposed on the driver.

11. The mechanism of claim 10, wherein actuation of the actuating button allows the bias magnet to move from an unaligned position, in which the bias magnet is not aligned with the locating magnet, to an aligned position, in which the bias magnet is aligned with the locating magnet and the proximity switch is calibrated.

12. The mechanism of claim 10, wherein the actuating button is coupled to the driver by the collar, the collar having at least one arm that engages the at least one pathway of the cam to disengage the driver from the target carrier, and the actuating button has a spring that biases the actuating button toward an undepressed position.

13. The mechanism of claim 11, wherein in the aligned position the primary magnet is aligned with the proximity switch, and in the unaligned position, the primary magnet is not aligned with the proximity switch.

14. The mechanism of claim 12, wherein when the actuating button moves back to the undepressed position, the collar to moves out of the at least one pathway in the cam, allowing the driver to move back into the target carrier, and reengaging the driver with the target carrier.

15. The mechanism of claim 12, the cam further comprising an end with an inner surface and an outer surface and a cylindrical portion extending from the inner surface, the cylindrical portion having the spring for biasing the actuating button toward the undepressed position.

16. A method of calibrating a proximity switch of a switch box operatively connected to an actuator having a shaft, the method comprising:
attaching a base of a calibration mechanism to a target carrier of the calibration mechanism, the base having a ring magnet and a locating magnet polarized in the same direction, and the target carrier having a primary magnet and a bias magnet polarized in the same direction as the ring and locating magnets and rotatable about the shaft;
engaging a driver of the calibration mechanism with the target carrier, the driver rotatable about the shaft when engaged with the target carrier;
actuating an actuating button of a calibration mechanism to a depressed position;
disengaging a driver of the calibration mechanism from a target carrier of the calibration mechanism,
allowing the primary magnet of the target carrier to move back to a position in which the primary magnet is aligned with the proximity switch via the magnets;
returning the actuating button to an undepressed position; and
reengaging the driver with the target carrier.

17. The method of claim 16, wherein disengaging the driver of the calibration mechanism from the target carrier further comprises engaging a collar disposed on the driver with a pathway of a cam of the actuating button.

18. The method of claim 16, wherein reengaging the driver with the target carrier further comprises moving a collar disposed on the driver out of a pathway of a cam of the actuating button.

19. The method of claim 16, wherein reengaging the driver with the target carrier further comprises constraining the driver to the target carrier via a spline path of each of the driver and the target carrier when the actuating button is in the undepressed position.

20. The method of claim 16, further comprising constraining the driver to the shaft via a pin-in-slot connection.

21. The method of claim 16, further comprising automatically moving the bias magnet into alignment with the locating magnet when the driver is disengaged from the target carrier.

\* \* \* \* \*

UNITED STATES PATENT AND TRADEMARK OFFICE
CERTIFICATE OF CORRECTION

PATENT NO. : 9,664,536 B2
APPLICATION NO. : 14/612610
DATED : May 30, 2017
INVENTOR(S) : Scott Carpenter et al.

Page 1 of 1

It is certified that error appears in the above-identified patent and that said Letters Patent is hereby corrected as shown below:

On the Title Page

At item (73), Line 2, "Company" should be -- Company, Inc., --.

In the Claims

At Column 12, Line 38, "mechanism," should be -- mechanism; --.

Signed and Sealed this
Twenty-fifth Day of September, 2018

Andrei Iancu
*Director of the United States Patent and Trademark Office*